United States Patent
Voiles

(10) Patent No.: US 9,429,978 B2
(45) Date of Patent: Aug. 30, 2016

(54) PASSIVE CONTROL STICK

(71) Applicant: Woodward, Inc., Fort Collins, CO (US)

(72) Inventor: Jeffrey T. Voiles, Niles, IL (US)

(73) Assignee: Woodward, Inc., Fort Collins, CO (US)

( * ) Notice: Subject to any disclaimer, the term of this patent is extended or adjusted under 35 U.S.C. 154(b) by 297 days.

(21) Appl. No.: 13/750,257

(22) Filed: Jan. 25, 2013

(65) Prior Publication Data
US 2014/0208881 A1 Jul. 31, 2014

(51) Int. Cl.
G05G 9/047 (2006.01)
B64C 13/04 (2006.01)
G05G 5/05 (2006.01)

(52) U.S. Cl.
CPC ............. *G05G 9/047* (2013.01); *B64C 13/04* (2013.01); *G05G 5/05* (2013.01); *G05G 2009/04766* (2013.01); *Y10T 74/20201* (2015.01)

(58) Field of Classification Search
CPC .................. G05G 5/05; G05G 9/047; G05G 2009/04711; G05G 2009/04725; G05G 2009/04733
USPC ...................................... 74/471 XY; 345/161
See application file for complete search history.

(56) References Cited

U.S. PATENT DOCUMENTS

| | | | |
|---|---|---|---|
| 3,308,675 A * | 3/1967 | Jonsson | 74/471 R |
| 4,375,631 A * | 3/1983 | Goldberg | 338/128 |
| 4,479,038 A * | 10/1984 | Marhold | G05G 9/04785 200/553 |
| 4,492,128 A * | 1/1985 | Heidelberger | G05G 9/047 200/6 A |
| 4,784,008 A * | 11/1988 | Paquereau | G05G 5/05 200/6 A |
| 5,068,498 A * | 11/1991 | Engel | G05G 9/047 200/6 A |
| 5,473,235 A | 12/1995 | Lance et al. | |
| 5,559,432 A * | 9/1996 | Logue | 324/207.17 |
| 5,889,242 A * | 3/1999 | Ishihara et al. | 200/6 A |
| 6,189,401 B1 * | 2/2001 | Atwell | G05G 9/047 200/6 A |
| 6,227,066 B1 * | 5/2001 | Stachniak | 74/471 XY |
| 6,713,692 B2 * | 3/2004 | Yamasaki | 200/6 A |

(Continued)

FOREIGN PATENT DOCUMENTS

| | | |
|---|---|---|
| FR | 2890464 | 3/2007 |
| GB | 2096746 | 10/1982 |
| GB | 2107029 | 4/1983 |
| JP | 2009-080533 | 4/2009 |

OTHER PUBLICATIONS

International Search Report and Written Opinion of the International Searching Authority issued in International Application No. PCT/US2014/011853 on Jun. 16, 2014; 13 pages.

(Continued)

*Primary Examiner* — David M Fenstermacher
(74) *Attorney, Agent, or Firm* — Fish & Richardson P.C.

(57) ABSTRACT

A control apparatus includes a first mounting plate, a restoring plate having a first surface disposed adjacent the first mounting plate, and a second surface. The control apparatus also includes an elongate member that includes a first elongate portion, a second elongate portion, an axis member between the first elongate portion and the second elongate portion pivotally mounting the elongate member to the first mounting plate and defining a first axis, a displaceable force plate having a substantially flat surface disposed adjacent the second surface of the restoring plate, and a compliant member providing a biasing force between a retaining portion and the force plate against the second surface of the restoring plate. The mass of the second elongate portion substantially offsets the mass of the first elongate portion about the axis member.

18 Claims, 2 Drawing Sheets

(56) References Cited

U.S. PATENT DOCUMENTS

| | | | |
|---|---|---|---|
| 6,714,188 B1 * | 3/2004 | Zebuhr et al. | 345/163 |
| 8,079,281 B2 | 12/2011 | Taylor et al. | |
| 2004/0221674 A1 * | 11/2004 | Kornelson | G05G 9/047 74/471 XY |

2009/0229396 A1  9/2009  Taylor et al.

OTHER PUBLICATIONS

PCT International Preliminary Report on Patentability, PCT/US2014/011853, Aug. 6, 2015, 9 pages.

* cited by examiner

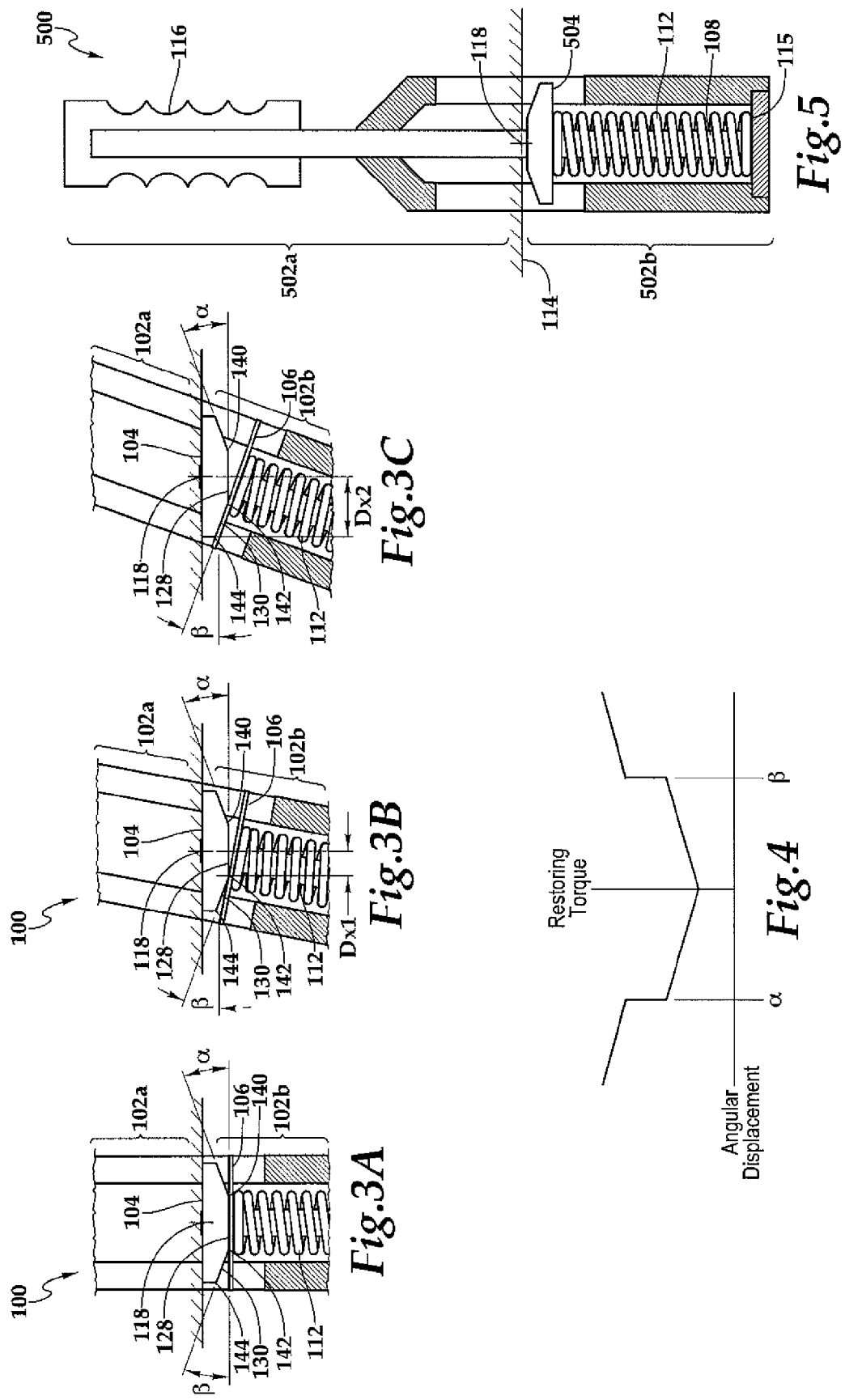

PASSIVE CONTROL STICK

TECHNICAL FIELD

This specification relates to mechanical input controls, and more particularly, aircraft flight controls.

BACKGROUND

Joystick input devices have been employed in a wide range of applications, from aircraft control to video game inputs. Joysticks may be provided to supply directional input information related to a single rotational axis, or to multiple axes. More sophisticated joystick instruments may provide magnitude data as well.

In operation, an operator will manually displace the joystick relative to one or more of its rotational axes in order to issue directional commands to other equipment. Sensors within the joystick will sense the angular displacement of the joystick and develop input signals accordingly, which may be transmitted to the equipment to be controlled. The sensors and the signals they produce may operate electronically, hydraulically, or otherwise.

In many applications it is desirable that the joystick return to a center or neutral position after it has been released by the operator. Many joysticks are designed to be displaced about two perpendicular axes, so that directional information may be detected through 360 degrees. Thus, in order to return the joystick to a center position on one or both axes, certain designs have included springs to provide a centering force relative to each axis. While these mechanisms can provide the desired centering functions, these return mechanisms also tend to add weight, complexity, and cost to the design of the joystick, and cause the joystick to be mass unbalanced and therefore more susceptible to the effects of acceleration, e.g., to resist movement of the stick by gravity, g-forces.

SUMMARY

In general, this document describes mechanical input controls, and more particularly, aircraft flight controls.

In a first aspect, a control apparatus includes a first mounting plate, a restoring plate having a first surface disposed adjacent the first mounting plate, and a second surface. An elongate member includes a first elongate portion, a second elongate portion, an axis member between the first elongate portion and the second elongate portion, pivotally mounting the elongate member to the first mounting plate and defining a first axis, a displaceable force plate having a substantially flat surface disposed adjacent the second surface of the restoring plate, and a compliant member providing a biasing force between a retaining portion and the force plate against the second surface of the restoring plate. The mass of the second elongate portion substantially offsets the mass of the first elongate portion about the axis member.

Implementations can include some, all, or none of the following features. The second elongate portion can include the compliant member and the retaining member. The second surface of the restoring plate can be multi-faceted and can include a center position facet symmetrically located relative to the first axis, the center position comprising an angular position of the restoring plate wherein the center position facet abuts the substantially flat surface of said force plate and said restoring force is evenly distributed on opposite sides of said first axis. A second mounting bracket can define a second axis, the force plate being pivotally mounted to the second mounting bracket about the second axis, the centering force being evenly distributed about the second axis when the substantially flat surface of the force plate abuts the center position facet. A first lateral facet can be adjacent the center position facet and form a first angle therewith, the first lateral facet intersecting the center position facet along a first contact line extending substantially parallel to the first axis. A first secondary lateral facet can be adjacent the first lateral facet and form a second angle therewith, the first secondary lateral facet intersecting the first lateral facet along a second contact line extending substantially parallel to the first axis. A second lateral facet can be adjacent the center position facet and form a third angle therewith, the second lateral facet intersecting the center position facet along a third contact line extending substantially parallel to the first axis. The self-centering, angularly displaceable member can also include a second secondary lateral facet adjacent the second lateral facet and forming a fourth angle therewith, the second secondary lateral facet intersecting the second lateral facet along a fourth contact line extending substantially parallel to the first axis. The displaceable force plate can be a linearly displaceable force plate. The first secondary lateral facet can be non-planar.

In a second aspect, a control apparatus includes a first mounting plate, a restoring plate having a first surface, and a second surface disposed adjacent the first mounting plate. An elongate member includes a first elongate portion, a second elongate portion, an axis member between the first elongate portion and the second elongate portion, pivotally mounting the elongate member to the first mounting plate and defining a first axis, and a compliant member providing a biasing force between a retaining portion and the first surface of the restoring plate. The mass of the second elongate portion substantially offsets the mass of the first elongate portion about the axis member.

Implementations can include some, all, or none of the following features. The second elongate portion can include the compliant member and the retaining member. The second surface of the restoring plate can be multi-faceted and can include a center position facet symmetrically located relative to the first axis, the center position comprising an angular position of the restoring plate wherein the center position facet abuts the substantially flat surface of said first mounting plate and said restoring force is evenly distributed on opposite sides of said first axis. A second mounting bracket can define a second axis, the restoring plate being pivotally mounted to the second mounting bracket about the second axis, the centering force being evenly distributed about the second axis when the substantially flat surface of the first mounting bracket abuts the center position facet. A first lateral facet can be adjacent the center position facet and form a first angle therewith, said first lateral facet intersecting the center position facet along a first contact line extending substantially parallel to the first axis. A first secondary lateral facet can be adjacent the first lateral facet and form a second angle therewith, the first secondary lateral facet intersecting the first lateral facet along a second contact line extending substantially parallel to the first axis. A second lateral facet can be adjacent the center position facet and form a third angle therewith, the second lateral facet intersecting the center position facet along a third contact line extending substantially parallel to the first axis. The self-centering, angularly displaceable member can include a second secondary lateral facet adjacent the second lateral facet and forming a fourth angle therewith, the second secondary lateral facet intersecting the second lateral facet along a fourth contact line extending substantially parallel to the first axis. At least one of the facets can be an arcuate surface.

In a third aspect a control apparatus includes a restoring plate having a first surface configured to be mounted adjacent to a first mounting plate, and a second surface. An elongate member includes a first elongate portion, a second elongate portion, an axis member between the first elongate portion and the second elongate portion, configured to pivotally mount the elongate member to the first mounting plate and defining a first axis, a linearly displaceable force plate having a substantially flat surface disposed adjacent the second surface of the restoring plate, and a compliant member providing a biasing force between a retaining portion and the force plate against the second surface of the restoring plate. The mass of the second elongate portion substantially offsets the mass of the first elongate portion about the axis member.

The apparatus described herein may provide one or more of the following advantages. First, a control apparatus can provide a control stick having a self-centering capability. Second, the control apparatus can be substantially mass-balanced about an axis. Third, the control apparatus can be substantially neutral to forces of acceleration. Fourth, the control apparatus can be constructed with reduced size (e.g., envelope), weight, cost, and/or parts count.

The details of one or more implementations are set forth in the accompanying drawings and the description below. Other features and advantages will be apparent from the description and drawings, and from the claims.

DESCRIPTION OF DRAWINGS

FIGS. 3A-3C are plan views of an example passive control stick at various operating positions.

FIG. 4 is an example torque profile for an example passive control stick.

FIG. 5 is a plan view of another example passive control stick.

DETAILED DESCRIPTION

This document describes mechanical devices for accepting operator input, such as flight control sticks or side sticks used by aircraft pilots. In general, an aircraft or other machine may provide a "joystick" type side stick user control, and an operator may manipulate the stick to control the machine. For example, the operator may push, pull, move side to side, or otherwise manipulate a control stick to steer the machine. In general, some implementations may benefit from a control stick configuration that automatically returns to a default position after being displaced, or one that substantially maintains default position against gravity or other acceleration forces, e.g., g-forces.

Weight, cost, and size, are other considerations that may generally influence the selection of a control stick mechanism, especially for use in aircraft applications. Issues of weight, cost, and/or size considerations, however, may run counter to the inclusion of self-centering features which can add complexity to a control stick design, and still may not provide the aforementioned substantial neutrality to g-forces.

This document describes a control stick design that is substantially mass balanced about its axis to provide increased resistance to movement under acceleration. In general, the balanced nature of the control stick is accomplished by incorporating mechanical components used for providing self-centering and other functions into the movable mechanisms of the control stick itself in a design that balances the amount of mass included on each control of the control stick's axis point. In some implementations, by incorporating the mass of such mechanisms into the balance of the control stick, the control stick can provide increased neutrality to acceleration without using additional counterweights, thereby providing increased neutrality without substantially increasing weight.

Figure 1B:
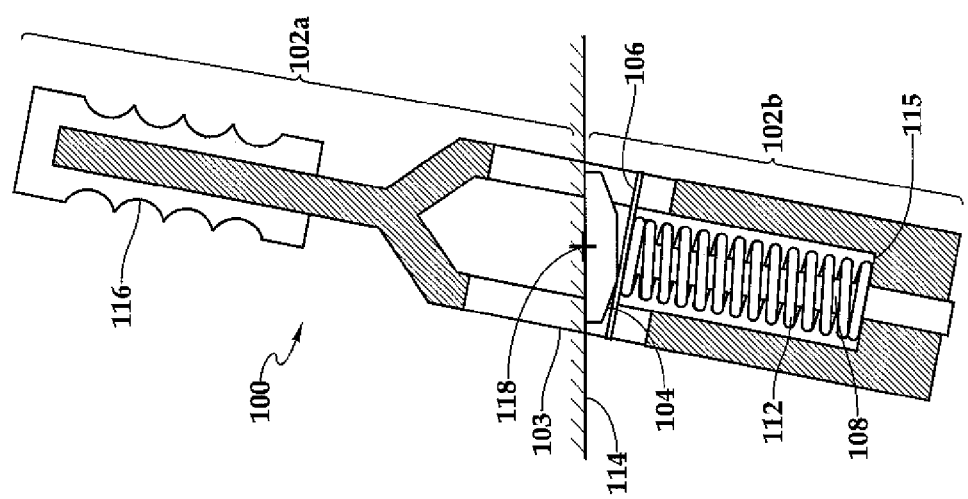
FIGS. 1A and 1B are plan views of an example passive control stick.
Figure 1A:
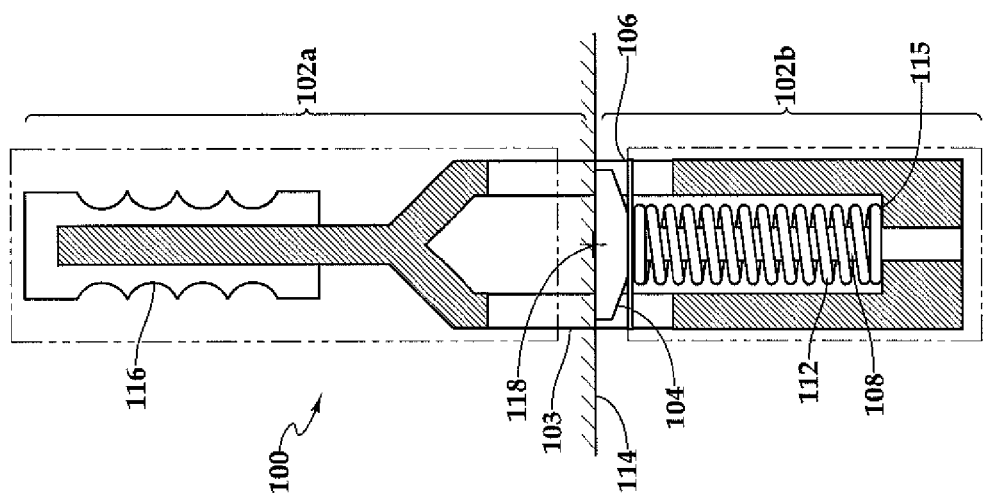

FIGS. 1A and 1B are plan views of an example passive control stick 100. In some embodiments, the passive control stick 100 can be provided as a side stick, a center stick, a control column, a control yoke, or any other appropriate adaptation of a lever control device. Referring to FIG. 1A, the passive control stick 100 is shown in a substantially centered or default position. The passive control stick 100 includes an upper elongate portion 102a extending above a fixture base plate 114 and a lower elongate portion 102b extending below the fixture base plate 114. The upper elongate portion 102a and the lower elongate portion 102b are two opposing radial sections of a rotary member 103, which rotates about an x-axis 118 located substantially at the fixture base plate 114. Angular displacement of the upper elongate portion 102a causes a similar angular displacement in the lower elongate portion 102b.

As shown in FIGS. 1A and 1B, the upper elongate member 102a includes a grip assembly 116. The grip assembly 116 extends radially away from the x-axis 118. In use, a user manipulates the grip assembly to cause the passive control stick to rotate about the x-axis 118. In some embodiments, the grip assembly may be formed for manipulation by a user. For example, the grip assembly may be sized and contoured to fit the hand of a pilot of other machine operator.

With regard to the example passive control stick 100, a restoring plate 104 is coupled to the underside of the fixture base plate 114. The restoring plate 104 remains substantially fixed relative to the movement of the passive control stick 100 about the x-axis 118. The restoring plate 104 will be discussed in further detail in the description of FIG. 2.

With regard to the example passive control stick 100, the lower elongate portion 102b includes a force plate 106 and a compliant member 112, e.g., a spring. The force plate 106 is disposed between the restoring plate 104 and the compliant member 112. Angular displacement of the lower elongate portion 102b is translated to rotation of the force plate 106 about the restoring plate 104. The force plate 106 is guided by a linear bearing 108 disposed between the force plate 106 and a base portion 115 of the lower elongate member 102b. The compliant member 112 is compressed between the force plate 106 and the base portion 115, biasing the force plate 106 against a lower surface of the restoring plate 104.

With regard to the example passive control stick 100, the upper elongate portion 102a and the lower elongate portion 102b are formed so the mass of the upper elongate portion 102a and the mass of the lower elongate portion 102b are substantially balanced across the x-axis 118. In some implementations, the mass of the upper elongate portion 102a may be equal to the mass of the lower elongate portion 102b, with their respective masses being distributed substantially symmetrically about the x-axis 118. In some implementations, the mass of the upper elongate portion 102a may be equal or unequal to the mass of the lower elongate portion 102b, with their respective masses being distributed substantially asymmetrically about the x-axis 118. For example, the upper elongate portion 102a may include relatively lightweight components located to create a relatively long lever arm, e.g., distance between the components and the fulcrum, and the lower elongate portion 102b may include relatively heavier components located to create a relatively shorter lever arm. As such, unequal masses and/or unequal lever lengths may be combined to substantially balance the distribution of the passive control stick about the x-axis.

Referring to FIG. 1B, the example passive control stick 100 is shown in an offset or rotated position. For example, a user may push the grip assembly 116 to the right, causing the passive control stick 100 to rotate clockwise as illustrated in FIG. 1B.

As will be discussed in further detail in the descriptions of FIGS. 3A-3C, as the example passive control stick 100 is moved away from the centered configuration shown in FIG. 1A, the force plate 106 rotates about the restoring plate 104. The shape of the restoring plate, which will be discussed in further detail in the description of FIG. 2, causes the force plate 106 to compress the compliant member 112. Compression of the force plate 106 against the surface of the restoring plate 104 forms a restoring force that urges the passive control stick back toward the substantially centered or default position shown in FIG. 1A.

Figure 2:
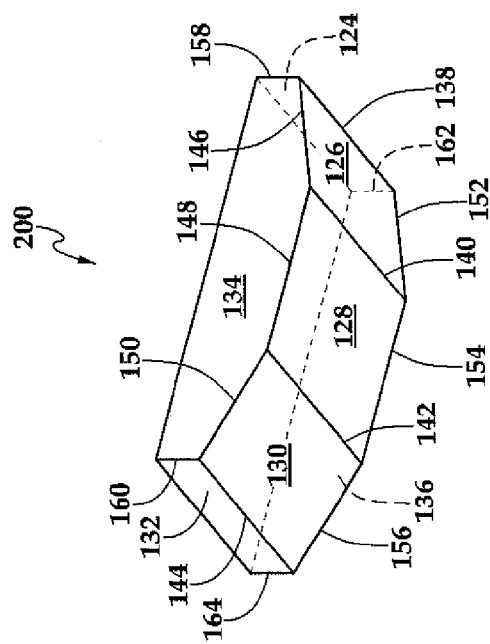
FIG. 2 is a perspective view of an example restoring plate.

FIG. 2 is a perspective view of an example restoring plate 200. In some implementations, the restoring plate 200 can be the restoring plate 104 of FIGS. 1A and 1B. The restoring plate 200 forms a cam-like surface comprised of a collection of adjacent planar segments, or facets. In the illustrated example, the multifaceted surface includes seven facets including a center position facet 128, lateral facets 126, 130, 134 and 6 backside 136, and secondary lateral facets 124, 132. Adjacent facets intersect along contact lines between each angled surface. In the illustrated example, there are ten contact lines labeled 138-156 (even numbers only) in FIG. 2. The vertical lines 158, 160, 162, and 164 forming the four corners of the restoring plate 104 may also be considered contact lines if the passive control stick 100 is allowed to pivot to such an extent that facets 124 and 134 are allowed to contact the force plate 106. As will be described in more detail below, contact lines 138, 140, 142, and 144 affect the rotation of the force plate 104 about the x-axis 118, and contact lines 146, 148, 150, and 152, 154, 156 affect rotation about the y-axis. The corners 158, 160, 162, and 164 will also affect the rotation of the restoring plate 104 about the y-axis, if the passive control stick 100 is allowed to rotate sufficiently to allow the corners to contact the force plate 106.

Facet 128 of the example passive control stick 100, located in the center of restoring plate 104, defines the center position of the passive control stick 100. FIG. 1 shows the example passive control stick 100 in the centered position with facet 128 abutting the surface of force plate 106. FIG. 3A shows the example passive control stick 100 in the centered position with facet 128 abutting the surface of force plate 106. In some embodiments, the facet 128 may be slightly non-planar. For example, the facet 128 may be formed with a slight undercut to reduce adhesion that may occur between the facet 128 and the force plate 106 in the presence of a fluid, e.g., a lubricant, when the force plate 106 is substantially coplanar to the facet 128. In some embodiments, the facet 128 may be omitted. For example, some applications may not benefit or require a centering action from the example passive control stick 100.

Although the example restoring plate 104 has been described as having planar facets, contact lines, and corners, other embodiments can exist. For example, the contact lines may be curved or arcuate rather than straight, greater or fewer facets may be used, the facets may be non-planar or arcuate rather than being substantially flat, and/or the corners may be rounded rather than sharp. Combinations of flat and arcuate surfaces, and/or straight, arcuate, smooth, and/or sharp transitions between surfaces can be combined to provide complex torque profiles according to the intended application of a passive control stick.

FIGS. 3A-3C are plan views of the example passive control stick 100 at various operating positions. FIG. 3A is a plan view of the example passive control stick 100 looking down the x-axis. In FIG. 3A the center position relative to the x-axis 118 is formed when the contact lines 140, 142 frame the left and right edges of facet 128, and are laterally offset a substantially equal distance from the x-axis 118. The restoring force exerted by force plate 106 acts substantially uniformly against facet 128 on each side of the x-axis 118. Thus, substantially no torque is developed tending to rotate the force plate 106 about the x-axis 118. The force plate 106 will tend to remain in the center position relative to the x-axis until an external displacement force is applied to the upper elongate member 102A. The passive control stick 100 will tend to remain substantially centered even when the passive control stick 100 is exposed to external forces of acceleration, such as gravity or g-forces, since the upper elongate member 102a and the lower elongate member 102b are substantially mass-balanced about the x-axis 118.

In contrast to the centered position, when the force plate 106 of the example passive control stick 100 is angularly displaced with regard to the x-axis 118 the restoring force exerted by force plate 106 is concentrated along lines or at points that are laterally offset from the x-axis 118. This generates a restoring torque which tends to return the force plate 106 to the center position. Thus, when the upper elongate member 102a of the passive control stick 100 is displaced by an external force such as a user manipulation, the restoring torque tends to re-center the passive control stick 100 as soon as the external force is removed. Conversely, the passive control stick 100 tends to remain substantially stable in the centered position until an external force is applied to the upper elongate member 102a.

In FIG. 3B, the example passive control stick 100 is displaced a small distance to the right by a force, causing the force plate 106 to rotate a small amount in the clockwise direction. The force plate 106 is rotated away from the contact line 140, and the force plate 106 is rotated into the contact line 142, further compressing the compliant member 112. Contact line 142 is offset from the x-axis 118 by a lateral distance Dx1. Thus, rotation of the forge plate 106 about the x-axis 118 generates a restoring torque substantially equal to the spring force applied to the contact line 142, multiplied by the distance Dx1. As the force plate 106 rotates about the x-axis 118, the distance Dx1 will vary little during the course of the limited angular displacement of the passive control stick 100. In some embodiments, the restoring torque can be proportional to the linear displacement of the force plate 106 due to the downward rotation of the force plate 106 away from the contact line 142. Rotation of the force plate 106 in the opposite direction of that shown in FIG. 3B will have substantially the same effect, only the force plate 106 will act against contact line 140 and the restoring torque will be directed in the opposite direction.

Referring now to FIG. 3C, the example passive control stick 100 has been displaced to the right by a relatively greater distance than in FIG. 3B, causing the force plate 106 to rotate in the clockwise direction by an amount equal to the angle β. Thus, the force plate 106 of FIG. 3C lies substantially parallel to the facet 130. If the passive control stick 100 is rotated further to the right, the surface of the force plate 106 will be rotated clear of the contact line 142, and force plate 106 will rotate against the contact line 144, further compressing the compliant member 112. The contact line 144 is located a distance from the x-axis equal to Dx2 which is greater than Dx1. When the contact line 144 engages the force plate 106, the force applied against the force plate 106 is offset further from the x-axis 118, and the restoring torque is increased proportionally.

In some embodiments, the example passive control stick 100 can include a mounting bracket defining a second axis. The force plate 106 can be pivotally mounted to the mounting bracket about the second axis, and the centering force can be substantially evenly distributed about the second axis when the force plate 106 is substantially parallel to the plane of the facet 128.

FIG. 4 is an example compound torque profile for the example passive control stick 100 of FIG. 1. In some embodiments, compound force profiles may be created in any practical direction by altering the lower surface of the restoring plate 104. For example, the angular position where the restoring torque jumps to a higher level may be manipulated by altering the angles α and β. In some embodiments, the size of the jump may be controlled by selecting the width of the lateral facets. With the restoring plate 104 profile shown in FIGS. 1, 2A-2B, and 3A-C, as the width of lateral facets 126 and 130, is increased, the distance Dx2 between the contact lines 140, 142 and the contact lines 138, 144 will increase. Thus, the greater the width of the lateral facets 126, 130, the greater will be the increase in the restoring torque at angles greater than α or β. In various embodiments, the passive control stick 100 can be a self-centering joystick capable of having multiple complex compound force profiles.

When the angular displacement of the force plate 106 is less than α or β, the restoring torque increases in a substantially linear manner with increasing angular displacement. However, when the angular displacement exceeds α or β, the restoring torque jumps to a higher level as the more distant contact lines 138, 144 engage the force plate 106. Once the angular displacement exceeds α or β, the restoring torque again increases linearly with further angular displacement of the force plate 106.

As discussed in the description of FIG. 2, although the example restoring plate 104 has been described as having planar facets, contact lines, and corners, other embodiments can exist. For example, the contact lines may be curved rather than straight, greater or fewer facets may be used, the facets may be non-planar rather than being substantially flat, and/or the corners may be rounded rather than sharp. Combinations of flat and curved surfaces, and/or smooth and sharp transitions can be combined to provide other torque profiles that can be relatively more or less complex than the example torque profile shown in FIG. 4.

FIG. 5 is a plan view of another example passive control stick 500. The example passive control stick 500 is substantially similar in form and function to the example passive control stick 100 of FIGS. 1A-1B, except that the restoring plate 104 has been replaced by a restoring plate 504, and the force plate 106 has been removed.

The restoring plate 504 of the example passive control stick 500 is substantially similar to the restoring plate 104, except the restoring plate 504 has been inverted vertically compared to the restoring plate 104. The restoring plate 504 is not coupled to the fixture base plate 114, rather fixture base plate 114 is compressed against the fixture base plate 114 by the compliant member 112 and is guided by the linear bearing 108.

Angular displacement of the example passive control stick 100 about the x-axis 118 causes the restoring plate 504 to rotate about the x-axis 118 as well. As the restoring plate 104 rotates, the contact lines of the restoring plate come into contact with the fixture base plate 114. This contact causes the restoring plate 104 to compress the compliant member 112 to create complex restoring torques substantially similar to those discussed in the descriptions of FIGS. 3A-3C. In various embodiments, the example passive control sticks 100 and 500, and/or the example restoring block 200 can be made of metal (e.g., aluminum, steel, titanium), plastic, composite materials (e.g., fiberglass, carbon fiber), wood, or combinations of these and/or any other appropriate material. In various embodiments, the example passive control sticks 100 and 500, and/or the example restoring block 200 can be formed by casting, molding, machining, extruding, or combinations of these and/or any other appropriate formation technique.

In some embodiments, the example passive control stick 500 can include a mounting bracket defining a second axis. The restoring plate 504 can be pivotally mounted to the mounting bracket about the second axis, and the centering force can be substantially evenly distributed about the second axis when the restoring plate 504 is substantially parallel to the plane of the facet 128.

Although a few implementations have been described in detail above, other modifications are possible. For example, other components may be added to, or removed from, the described systems. Accordingly, other implementations are within the scope of the following claims.

What is claimed is:

1. A control apparatus comprising:
a first mounting plate;
a restoring plate having a first surface disposed adjacent the first mounting plate, and a second surface;
an elongate member comprising:
a first elongate portion;
a second elongate portion comprising a compliant member and a retaining portion;
an axis member between the first elongate portion and the second elongate portion, pivotally mounting the elongate member to the first mounting plate and defining a first axis; and
a force plate having a substantially flat surface disposed adjacent the second surface of the restoring plate;
wherein the compliant member provides a biasing force between the retaining portion and the force plate against the second surface of the restoring plate in which contact between the force plate and the second surface, provided by the biasing force, provides a restoring torque that urges pivotal movement of the elongate member about the first axis away from a non-centered position and toward a center position, and the mass of the second elongate portion substantially balances the mass of the first elongate portion about the axis member.

2. The apparatus of claim 1, wherein the second surface of the restoring plate is multi-faceted and includes a center position facet symmetrically located at a center position relative to the first axis, the center position comprising an angular position of the restoring plate wherein the center position facet abuts the substantially flat surface of said force plate and said restoring force is evenly distributed on opposite sides of said first axis.

3. The apparatus of claim 1 further comprising a mounting bracket defining a second axis, the force plate being pivotally mounted to the mounting bracket about the second axis, the biasing force being evenly distributed about the second axis when the substantially flat surface of the force plate abuts the center position facet.

4. The apparatus of claim 2 further comprising a first lateral facet adjacent the center position facet and forming a first angle therewith, said first lateral facet intersecting the center position facet along a first contact line extending substantially parallel to the first axis.

5. The apparatus of claim 4 further comprising a first secondary lateral facet adjacent the first lateral facet and forming a second angle therewith, the first secondary lateral facet intersecting the first lateral facet along a second contact line extending substantially parallel to the first axis.

6. The apparatus of claim 5 further comprising a second lateral facet adjacent the center position facet and forming a third angle therewith, the second lateral facet intersecting the center position facet along a third contact line extending substantially parallel to the first axis.

7. The apparatus of claim 6, further comprising a second secondary lateral facet adjacent the second lateral facet and forming a fourth angle therewith, the second secondary lateral facet intersecting the second lateral facet along a fourth contact line extending substantially parallel to the first axis.

8. The apparatus of claim 1, wherein the force plate is a linearly displaceable force plate.

9. The apparatus of claim 5, wherein the first secondary lateral facet is non-planar.

10. A control apparatus comprising:
a first mounting plate;
a restoring plate having a first surface, and a second surface disposed adjacent the first mounting plate;
an elongate member comprising:
a first elongate portion;
a second elongate portion comprising a compliant member and a retaining portion;
an axis member between the first elongate portion and the second elongate portion, pivotally mounting the elongate member to the first mounting plate and defining a first axis;
wherein the compliant member provides a biasing force between the retaining portion and the first surface of the restoring plate in which contact between the force plate and the second surface, provided by the biasing force, provides a restoring torque that urges pivotal movement of the elongate member about the first axis away from a non-centered position and toward a center position, and the mass of the second elongate portion substantially balances the mass of the first elongate portion about the axis member.

11. The apparatus of claim 10, wherein the second surface of the restoring plate is multi-faceted and includes a center position facet symmetrically located at a center position relative to the first axis, the center position comprising an angular position of the restoring plate wherein the center position facet abuts the substantially flat surface of said first mounting plate and said restoring force is evenly distributed on opposite sides of said first axis.

12. The apparatus of claim 10 further comprising a mounting bracket defining a second axis, the restoring plate being pivotally mounted to the mounting bracket about the second axis, the biasing force being evenly distributed about the second axis when the center position facet abuts the substantially flat surface of said first mounting plate.

13. The apparatus of claim 11 further comprising a first lateral facet adjacent the center position facet and forming a first angle therewith, said first lateral facet intersecting the center position facet along a first contact line extending substantially parallel to the first axis.

14. The apparatus of claim 13 further comprising a first secondary lateral facet adjacent the first lateral facet and forming a second angle therewith, the first secondary lateral facet intersecting the first lateral facet along a second contact line extending substantially parallel to the first axis.

15. The apparatus of claim 14 further comprising a second lateral facet adjacent the center position facet and forming a third angle therewith, the second lateral facet intersecting the center position facet along a third contact line extending substantially parallel to the first axis.

16. The apparatus of claim 15, further comprising a second secondary lateral facet adjacent the second lateral facet and forming a fourth angle therewith, the second secondary lateral facet intersecting the second lateral facet along a fourth contact line extending substantially parallel to the first axis.

17. The apparatus of claim 11, wherein at least one of the facets is an arcuate surface.

18. A control apparatus comprising:
a restoring plate having a first surface configured to be mounted adjacent to a first mounting plate, and a second surface;
an elongate member comprising:
a first elongate portion;
a second elongate portion comprising a compliant member and a retaining portion;
an axis member between the first elongate portion and the second elongate portion, configured to pivotally mount the elongate member to the first mounting plate and defining a first axis; and
a force plate having a substantially flat surface disposed adjacent the second surface of the restoring plate;
wherein the compliant member provides a biasing force between the retaining portion and the force plate against the second surface of the restoring plate in which contact between the force plate and the second surface, provided by the biasing force, provides a restoring torque that urges pivotal movement of the elongate member about the first axis away from a non-centered position and toward a center position, and the mass of the second elongate portion substantially balances the mass of the first elongate portion about the axis member.

* * * * *